Figure 5:
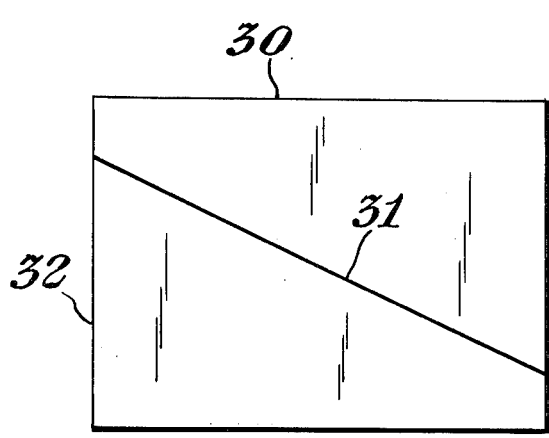

United States Patent [19]

Bosche et al.

[11] 4,040,256
[45] Aug. 9, 1977

[54] FLUME MIXER

[75] Inventors: Earl E. Bosche, Alvin; Jay M. Havlik; James C. Kyle, both of Lake Jackson, all of Tex.

[73] Assignee: The Dow Chemical Company, Midland, Mich.

[21] Appl. No.: 705,310

[22] Filed: July 14, 1976

[51] Int. Cl.² .............................................. B01F 5/00
[52] U.S. Cl. ........................................ 61/15; 138/42; 259/4 AB
[58] Field of Search ............... 61/14, 15; 259/4 R, 259/4 AB, 4 AC, 18, 4 A; 138/38, 42; 210/320

[56] References Cited

U.S. PATENT DOCUMENTS

| 3,238,003 | 2/1966 | Smith | 138/38 |
|---|---|---|---|
| 3,284,991 | 11/1966 | Ploeger et al. | 210/320 |
| 3,620,506 | 11/1971 | So | 259/4 AB |
| 3,923,288 | 12/1975 | King | 138/42 |
| 3,924,139 | 12/1975 | Mirose et al. | 210/320 |
| Re. 28,072 | 7/1974 | Sluijters | 259/4 AB |

FOREIGN PATENT DOCUMENTS

| 676,901 | 12/1963 | Canada | 259/4 AB |
|---|---|---|---|
| 1,308,573 | 10/1962 | France | 259/4 AB |

Primary Examiner—Paul R. Gilliam
Assistant Examiner—Alex Grosz
Attorney, Agent, or Firm—Robert B. Ingraham

[57] ABSTRACT

A flume mixer is provided which employs mixing cells; the mixing cells comprise first and second generally horizontally disposed flow directing elements extending between flume side walls. The mixing elements are generally in angular relationship to each other and the longitudinal axis of the flume. Each of the elements on an end projection along the longitudinal axis of the flume are asymmetric about a plane passing through the axis of the flume and extending parallel to the side walls thereof. Immediately adjacent, mixing elements or baffles have a major portion of their projected areas lying on opposite side of said plane.

8 Claims, 8 Drawing Figures

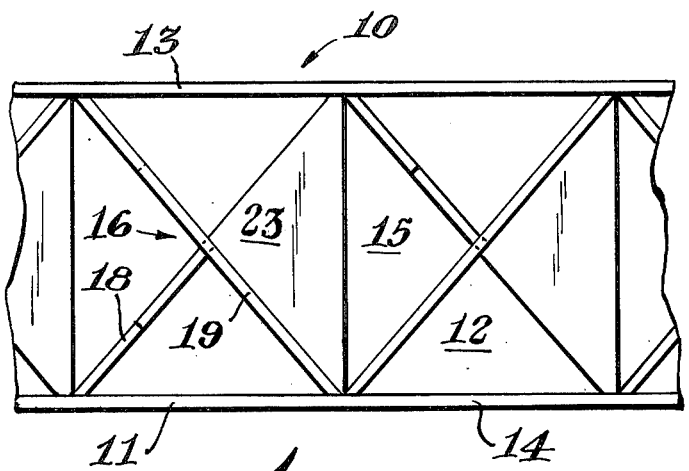
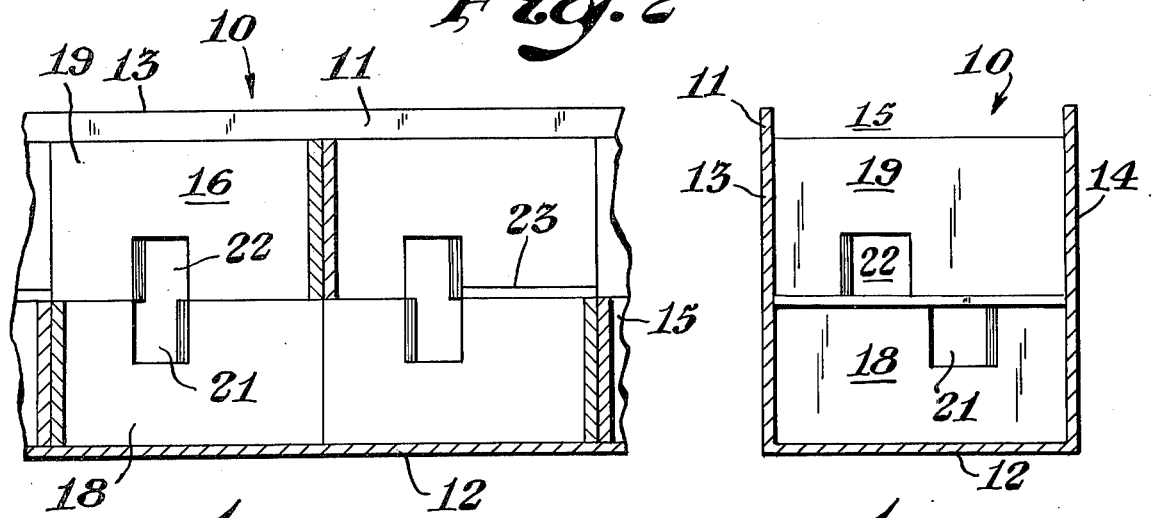
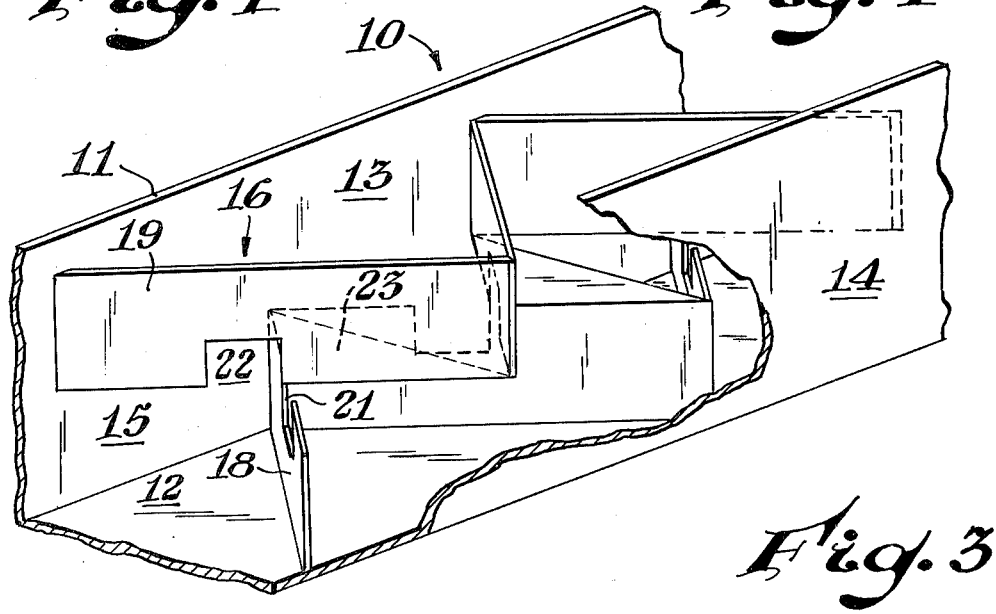

FLUME MIXER

Large quantities of water are often conveyed by flumes either for discharge or to a suitable water-treating facility. It is generally desirable to maintain the quality of the water being discharged from a given installation at a constant value in order that no undesirable ecological effects will occur or that the load on a given waste water treatment facility will not vary unduly. If the water quality can be adjusted while flowing rather than when in a containment pond or other large vessel frequently substantially less capital investment is required to peform the task. A number of mixers have been developed which are conveniently installed within a pipe or other similar conduit that divide, recombine or otherwise manipulate a stream flowing therethrough to obtain a desired degree of mixing. A variety of such so-called static mixers employing plate-like elements are set forth in the following U.S. Pat.: 3,620,506; 3,643,927; 3,652,061; 3,751,009; 3,918,688; and 3,923,288. Such mixers are not readily applied to a flume unless the flow rate is relatively slow. Beneficially, a mixer for a flume is conveniently anchored to the side walls thereof and does not require major support from the top of the flume.

It would be advantageous if there were available for a flume a mixer having no moving parts.

It would also be desirable if there were available for a flume a mixer of simple construction of no moving parts.

It would also be desirable if there were available a mixer for a flume which could be principally supported from the side walls of the flume.

These features and other advantages in accordance with the teaching of the present invention are obtained in a flume mixer, the flume mixer comprising a flume having a bottom, flume side walls affixed to said bottom, side walls and the bottom defining a liquid--flow channel having a longitudinal axis extending generally parallel to the side walls and bottom, a first mixing element disposed within the flume, the first mixing element comprising at least a bottom baffle and a top baffle, the top baffle and the bottom baffle being of generally elongate configuration, the bottom baffle extending between the side walls and being affixed thereto, the bottom baffle being angularly disposed within the channel, relative to the longitudinal axis of the channel and a plane perpendicular to the longitudinal axis of the channel, a second or upper baffle being generally similarly disposed in the channel above the bottom baffle and affixed to the side walls of the flume with the further limitation that the upper baffle is angularly disposed relative to the lower baffle and vertically projected centers of the upper baffle and the lower baffle are generally adjacent, the upper and lower baffles each being asymmetric about their centers in a projection of the baffles on a cross-section of the flume channel along the axis and that the upper baffle and the lower baffle in such a projection having major areas on opposite sides of a plane containing the longitudinal axis of the channel and extending generally parallel to the side walls, at least a second mixing cell disposed adjacent the first mixing cell, the second mixing cell being of generally like construction to the first mixing cell, the first and second mixing cells having a generally mirror image configuration about a plane normal to the longitudinal axis of the channel and disposed between the first and second mixing cells.

Figure 6:
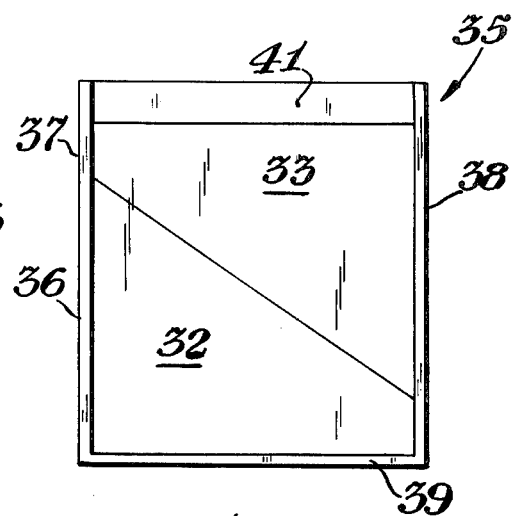
Figure 8:
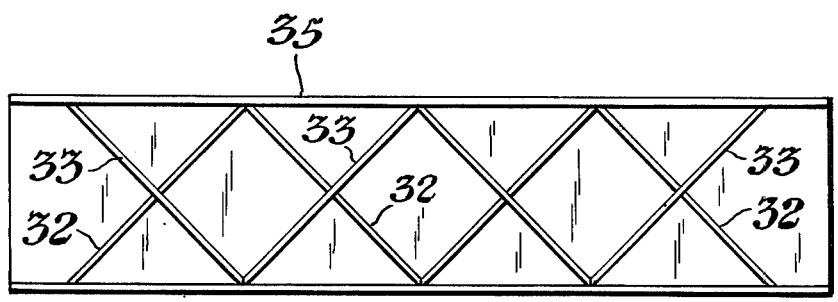
Figure 7:
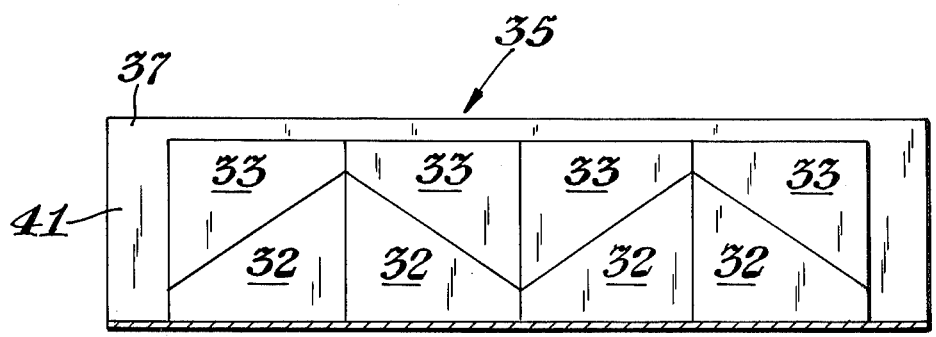

Further features and advantages of the present invention will become more apparent from the following specification taken in connection with the drawing wherein:

FIGS. 1 through 4 are side sectional plan, isometric and end views, respectively, of a portion of a mixer in accordance with the present invention;

FIG. 5 schematically represents two baffles of an alternate embodiment of the invention;

FIGS. 6, 7 and 8 schematically show an end view, sectional side view and plan view of an alternate flume mixer in accordance with the present invention.

In FIGS. 1 through 4 are side sectional, plan, isometric and end views, respectively, of a mixer in accordance with the present invention generally designated by the reference numeral 10. The mixer 10 comprises a flume 11. The flume 11 has a bottom 12, a first side wall 13 and a second side wall 14. The first and second side walls 13 and 14 are affixed to the bottom 12 to form a generally rectangular upwardly facing channel 15. The channel 15 has a longitudinal axis (not shown) extending parallel to the side walls 13, 14 and the bottomm 12. Disposed within the channel 15 is a first mixing cell 16. The mixing cell 16 comprises a first or lower baffle 18 and a second or upper baffle 19. The baffles 18 and 19 are of generally like-configuration and are elongate generally rectangular members extending between the side walls 13 and 14. The baffles 18 and 19 are both connected to the walls 13 and 14. The baffle 18 defines an upwardly facing recess or passage 21 and the baffle 19 defines a downwardly facing recess 22. The recesses 21 and 22 are asymmetrically disposed about a vertically extending centerline of the baffles 18 and 19. The baffles 18 and 19 are angularly disposed with respect to the side walls 13 and 14, the longitudinal axis of the channel 15, and the baffles 18 and 19 are angularly disposed with respect to each other. A vertical projection of the baffles 18 and 19 on the bottom 12 of the flume has a cruciform configuration generally symmetrically disposed with respect to a projection of the longitudinal axis of the flume projected on the bottom 12. A stiffener or plate-like reinforcing element 23 is horizontally disposed within the channel 15. The stiffener 23 is generally parallel to the bottom 12; has an isosceles triangular configuration wherein the base is roughly equal to the width of the flume. The remaining two sides have a length equal to about one-half the length of the baffles 18 and 19. The stiffener 23 is affixed to adjacent edges of the baffles 18 and 19 in one sector of the cruciform configuration to provide mechanical reinforcement therefor and is not believed to play any significant part in mixing, however, as depicted in FIGS. 1 and 2 it is preferred the flow be from right to left.

In FIG. 5 there is schematically represented the preparation of baffles for an alternate flume mixer in accordance with the present invention. FIG. 5 depicts a rectangular plate designated by the reference numeral 30. The plate 30 is divided along a generally diagonal line 31 to form first and second mixing baffles 32 and 33, respectively. The baffles 32 and 33 have like quadrilateral, generally triangular configurations.

In FIG. 6 there is schematically depicted an end view of a flume mixer in accordance with the present invention generally designated by the reference numeral 35. The flume mixer 35 comprises a flume 36 having upwardly extending side members 37 and 38 affixed to a bottom 39. The side members 37 and 38 together with the bottom member 39 define a generally rectangular elongate upwardly facing channel 41. Within the channel 41 are disposed baffles 32 and 33. The baffles 32 and 33 are disposed in the manner of the baffles 18 and 19 of FIGS. 1 through 4 to form a plurality of adjacent mixing cells of opposite hand.

FIG. 7 depicts a sectional side view of the mixer of FIG. 6 having four mixing cells and FIG. 8 is a plan view of the embodiment of FIGS. 6 and 7.

In the preparation of mixing in accordance with the embodiment of FIGS. 6, 7 and 8, the dimension of the shortest side of a baffle such as the baffles 32 and 33 is chosen to resist the expected pressure of flow thereagainst by the stream within the flume. If attachment to the bottom of the flume is possible, the shortest side of the baffle 32 may be zero whereas the shorter side of the upper baffle 33 must be of a dimension which provides sufficient strength for the baffle 33 to be retained within the flume. Obviously, additional bracing may be employed, for example, by the use of appropriate brackets to attach the baffles to the flume walls.

The embodiment of FIG. 1 is particularly desirable in that mixing is most vigorous in the regions of the openings or recesses 21 and 22. In one experiment, a flume mixer was constructed in accordance with the embodiment of FIGS. 1 through 4 and employed to admix about twenty gallons per minute of a neutralizing agent with 3,000 gallons per minute of water. The pH of water was determined at various locations along the mixer corresponding to the cell junctions. Satisfactory mixing was obtained after passing through two mixing cells. The embodiment of FIG. 1 is the preferred embodiment of the invention having maximum mixing action with minimal pressure drop whereas the mixing action of the embodiment of FIGS. 6 through 8 is somewhat less than that of the embodiment of FIGS. 1 through 4. The embodiment of FIGS. 6 through 8 is more easily fabricated. The cross-section of the flume has been illustrated as rectangular, however, other configurations may be employed such as trapezoidal or the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A flume mixer, the flume mixer comprising a flume having a bottom, flume side walls affixed to said bottom, the side walls and the bottom defining a liquid-flow channel having a longitudinal axis extending generally parallel to the side walls and bottom, a first mixing element disposed within the flume, the first mixing element comprising at least a bottom baffle and a top baffle, the top baffle and the bottom baffle being of generally elongate configuration, the bottom baffle extending between the side walls and being affixed thereto, the bottom baffle being angularly disposed within the channel, relative to the longitudinal axis of the channel and a plane perpendicular to the longitudinal axis of the channel, a second or upper baffle being generally similarly disposed in the channel above the bottom baffle and affixed to the side walls of the flume with the further limitation that the upper baffle is angularly disposed relative to the lower baffle and vertically projected centers of the upper baffle and the lower baffle are generally adjacent, the upper and lower baffles each being asymmetric about their centers in a projection of the baffles on a cross-section of the flume channel along the axis and that the upper baffle and the lower baffle in such a projection have major areas on opposite sides of a plane containing the longitudinal axis of the channel and extending generally parallel to the side walls to form a first mixing cell, at least a second mixing cell disposed adjacent the first mixing cell, the second mixing cell being of generally like construction to the first mixing cell, the first and second mixing cells having a generally mirror image configuration about a plane normal to the longitudinal axis of the channel and disposed between the first and second mixing cells.

2. The mixer of claim 1 wherein said baffles are generally rectangular.

3. The mixer of claim 2 wherein both the upper and lower baffles define generally adjacent recesses passing through the baffles.

4. The mixer of claim 3 wherein the recesses are generally adjacent the centers of the baffles.

5. The mixer of claim 4 wherein the recesses have a generally rectangular configuration.

6. The mixer of claim 1 including reinforcement means in operative combination with the baffles to resist deflection of the baffles by flow through the mixer.

7. The mixer of claim 1 wherein the baffles have a generally triangular configuration.

8. The mixer of claim 7 wherein the baffles have a generally right triangular configuration.

* * * * *